Jan. 13, 1931. E. A. SPERRY 1,788,807
CONTROL GYRO
Filed July 24, 1925

Inventor
Elmer A. Sperry.
By his Attorney
Herbert H. Thompson

Patented Jan. 13, 1931

1,788,807

UNITED STATES PATENT OFFICE

ELMER A. SPERRY, OF BROOKLYN, NEW YORK, ASSIGNOR, BY MESNE ASSIGNMENTS, TO SPERRY GYROSCOPE COMPANY, INC., A CORPORATION OF NEW YORK

CONTROL GYRO

Application filed July 24, 1925. Serial No. 45,958.

This invention relates to control gyros, especially of the type used as base lines for such purposes as automatic steering of dirigible craft. Such gyros, unlike gyro compasses, are usually non-pendulous and are subject to deviations and tilting due to such forces as the earth's rotation. By this invention I provide means for automatically restoring the gyroscope to its original horizontal position, thereby preventing it from becoming so inclined as to become useless as a baseline for automatic steering.

I accomplish the above object preferably by periodically and automatically applying a restoring means to the control gyro for the purpose of centralizing the same. This means may take the form of a cage or bell-shaped housing whose position, relative to the craft, is fixed and which is adapted to be brought into engagement with the gyro in such manner as to maintain or restore the same to a predetermined initial position.

Other objects and advantages of this invention will become apparent in the following detailed description thereof.

In the accompanying drawings:

Fig. 1 is a plan view, partly sectioned and partly diagrammatic, of one form of my invention.

Fig. 2 is an end elevation thereof viewed from the contact end of the gyroscope.

Fig. 3 is a front elevation of a modified form of my invention.

Fig. 4 is a side elevation, partly sectioned vertically, of still another form of my invention.

Fig. 5 is a vertical section through an enlarged detail of the Fig. 4 device.

Referring to Figs. 1 and 2 of the drawings, there is shown a control gyro journaled within a housing 10 upon a horizontal shaft 11 for rotation in a vertical plane, the said housing 10 being pivoted upon a horizontal axis 12 at right angles to the shaft 11 within a vertical ring 13 pivoted about a vertical axis 14 (see Fig. 4) in a support 15. It will be apparent from this mounting that the gyroscope has three degrees of freedom and will tend to maintain its position in space. Rotation of the earth, however, will cause apparent deviation in azimuth, which can be compensated for by applying a small weight to one end of spinning shaft 11, and will also cause a tilting of a gyro axis. Other forces, such as friction in the bearings, etc., will also cause deviation in azimuth and frequently in elevation. The latter is especially objectionable, since when the spinning axis of the gyroscope becomes tilted from the horizontal through a substantial angle, it is unsuited for use as a baseline on a rolling ship.

It is apparent that if the gyro is to be utilized as a base line, as for example, for the purpose of maintaining a ship on its course in automatically steering the same, that such errors are highly undesirable and should be eliminated. For this purpose I have shown means for normally applying a force to the gyro to restore the same to its initial predetermined position. This force may take the form of a cage 20 which is preferably bell-shaped for ready engagement with the end of gyro rotor shaft 11. It will be seen that when the cage 20 is moved into engagement with the end of shaft 11, it will actuate said shaft to bring the same toward the apex of the cage. The cage is so mounted that this apex is in the predetermined base line. By applying the cage 20 to the gyro shaft 11, the gyro will be restored to the initial position, i. e., centralized with respect to the fore-and-aft line of the ship, and thus restored to its most effective position to steer the ship.

I provide mechanism for automatically and periodically applying said cage to the gyro at intervals frequent enough to prevent excessive displacement of the gyro and yet not so frequent as to interfere with the operation of the same as a base-line fixed in space, for it should be understood that the cage 20 moves with the fixed object and for the period during which it is in engagement with the gyro tends to cause said gyro to move with the object on which it is mounted instead of maintaining its position freely in space. For this purpose I may provide means, such as an electromagnet 21, for normally attracting an armature 22 fixed to or integral with cage 20 to maintain the same out of engagement with the gyro against the action of means, such as a spring 23, which tends to cause said engagement. I provide means for normally energizing electromagnet 21 and for periodically deenergizing it to permit spring 23 to move cage 20 into engagement with the gyro shaft 11. For this purpose I may utilize any of a plurality of means and as shown in Figs. 1 and 2, I may employ the gyro itself for operating the control mechanism. In this form the high speed of the gyro rotor shaft 11 is reduced by gearing, such as worm 25 on the shaft, worm wheel 26 meshing therewith, worm 27 on the shaft thereof which meshes with worm wheel 28. Eccentrically mounted on the shaft of the latter for rocking movement as the shaft rotates is a rocker arm 30 and pawl 30', the latter engaging the teeth of ratchet wheel 29. The shaft of the ratchet wheel 29 carries a trolley 31 which engages a contact ring 32. Said ring is an electric conductor forming part of the circuit of the electro-magnet 21. An insulated portion 33 separates the ends of said conductor so that when trolley 31 engages said portion 33, once during each revolution of said trolley, the circuit through electro-magnet 21 will be broken and the gyro will be caged. It will be understood that the reduction gearing may be such as to operate trolley 31 at any desired frequency to cause caging of the gyro at any desired intervals of time. The action of caging the gyro will, therefore, be not only automatic but periodic.

Instead of operating the circuit breaker from the gyro shaft, I may employ a clock mechanism as shown in Fig. 3 wherein one of the gears 35 of the clock 36 may be in the electric circuit of the magnet 21 and be provided with an insulated portion 37 adapted to engage one of the contacts 38 once during each revolution of gear 35 to break the circuit through magnet 21.

In Figs. 4 and 5 I have utilized the principle that the earth's rotation acting upon a control gyro of the type described will cause apparent tilting due to the fact that the direction of the axis of the gyroscope remains more or less fixed in space while the earth rotates out from under it. This tilt may be utilized for the purpose of breaking the circuit through magnet 21. For this purpose there is mounted upon the gyro case 10 a level 40 shown in detail in Fig. 5, having one contact, which may be formed by an end wall 41, in the electric circuit and having a second contact 42 near said first contact at such distance therefrom that it an be bridged by a metallic globule 43 within the level. These contacts are duplicated at each end of the level to take care of tilting in either direction. The degree of curvature of the level will, of course, determine the degree of tilt necessary before the cage is brought into action. Bridging the gap between contacts 41 and 42 by the globule 42 may be caused to close a circuit which can be made to actuate any conventional type of relay (not shown) to break the circuit through electromagnet 21.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In combination with a control gyro having three degrees of freedom, means for centralizing said gyro, means normally maintaining said centralizing means ineffective, and means controlled by the gyro for periodically and automatically rendering said last-named means ineffective and said centralizing means effective.

2. In combination with a control gyro having three degrees of freedom, means for centralizing said gyro, means normally maintaining said centralizing means ineffective, and means geared to the gyro and operated thereby for periodically and automatically rendering said last named means ineffective and said centralizing means effective.

In testimony whereof I have affixed my signature.

ELMER A. SPERRY.